(12) United States Patent  
Kumagai

(10) Patent No.: US 8,576,287 B2  
(45) Date of Patent: Nov. 5, 2013

(54) METHODS AND APPARATUS FOR JIGGLING CORRECTION IN IMAGES

(75) Inventor: Fumihiro Kumagai, Tokyo (JP)

(73) Assignee: Sony Corporation, Tokyo (JP)

( * ) Notice: Subject to any disclaimer, the term of this patent is extended or adjusted under 35 U.S.C. 154(b) by 260 days.

(21) Appl. No.: 12/952,322

(22) Filed: Nov. 23, 2010

(65) Prior Publication Data

US 2011/0128392 A1  Jun. 2, 2011

(30) Foreign Application Priority Data

Dec. 1, 2009  (JP) ................. 2009-273516

(51) Int. Cl.
*H04N 5/225* (2006.01)
*H04N 5/262* (2006.01)

(52) U.S. Cl.
USPC ............. 348/208.12; 348/208.5; 348/240.1

(58) Field of Classification Search
USPC .............. 348/208.99, 208.4, 208.5, 208.6, 348/208.12, 208.16, 240.99, 240.1, 240.3
See application file for complete search history.

(56) References Cited

U.S. PATENT DOCUMENTS

| | | | | |
|---|---|---|---|---|
| 5,420,632 A * | 5/1995 | Yamagiwa | ................. | 348/240.3 |
| 5,982,421 A * | 11/1999 | Inou et al. | ................. | 348/208.5 |
| 7,692,688 B2 * | 4/2010 | Kurata | ................. | 348/208.5 |
| 2006/0152604 A1 * | 7/2006 | Ishikawa | ................. | 348/240.99 |
| 2009/0153725 A1 * | 6/2009 | Kawahara | ................. | 348/347 |
| 2009/0160952 A1 * | 6/2009 | Nakakuki et al. | ................. | 348/208.4 |
| 2009/0167897 A1 * | 7/2009 | Fujita | ................. | 348/240.1 |
| 2010/0066864 A1 * | 3/2010 | Abe | ................. | 348/240.3 |

FOREIGN PATENT DOCUMENTS

JP   2004-088567   3/2004

* cited by examiner

*Primary Examiner* — Jason Whipkey
(74) *Attorney, Agent, or Firm* — Wolf, Greenfield & Sacks, P.C.

(57) ABSTRACT

Disclosed herein is an image capturing apparatus including, an optical zoom lens, an actuator for driving said optical zoom lens, an imaging device, a jiggling detection section, an optical jiggling correction section, an electronic jiggling correction section, and an optical zoom magnification change rate modulation section.

11 Claims, 11 Drawing Sheets

IF ALL BUT LINEAR, ZOOMING IS CARRIED OUT IN A VISUALLY CONSTANT VELOCITY MOVEMENT AT A UNIFORM REDUCTION RATIO

FIG. 1

| | ELECTRONIC HAND-JIGGLING CORRECTION | OPTICAL HAND-JIGGLING CORRECTION | HYBRID HAND-JIGGLING CORRECTION |
|---|---|---|---|
| CORRECTION ANGLE | ○ | ○ (BUT, PERFORMANCE DETERIORATES IN AN AREA CLOSE TO A CORRECTION ANGLE LIMIT) | ◎ (EVEN AT A HIGH MAGNIFICATION, IMAGE TAKING CAN BE CARRIED OUT WITH EASE) |
| COST | ◎ | ○ | ○ |
| RESOLUTION DETERIORATION | ○ (IF PROPERLY SET, THERE IS NO PROBLEM) | ○ (BECAUSE IT IS DIFFICULT TO STATICALLY BROWSE AT A HIGH MAGNIFICATION) | ○ (IF PROPERLY SET, THERE IS NO PROBLEM) |
| MOTION BLUR WITH A LARGE AMPLITUDE | △ (CORRECTION IS DIFFICULT) | ○ | ○ |
| SLOW SHUTTER | × (CORRECTION IS IMPOSSIBLE) | ○ | ○ |
| HIGH-FREQUENCY VIBRATION | ○ | ○ (STRONG IN PRINCIPLE BUT NOT GENERATED NORMALLY) | ○ |
| TELE CORRECTION ANGLE AND ZOOM MAGNIFICATION | △ | × (A SMALL SIZE AND A LOW COST DO NOT HOLD TRUE AT THE SAME TIME) | ◎ (IF PROPERLY SET, THERE IS NO PROBLEM) |

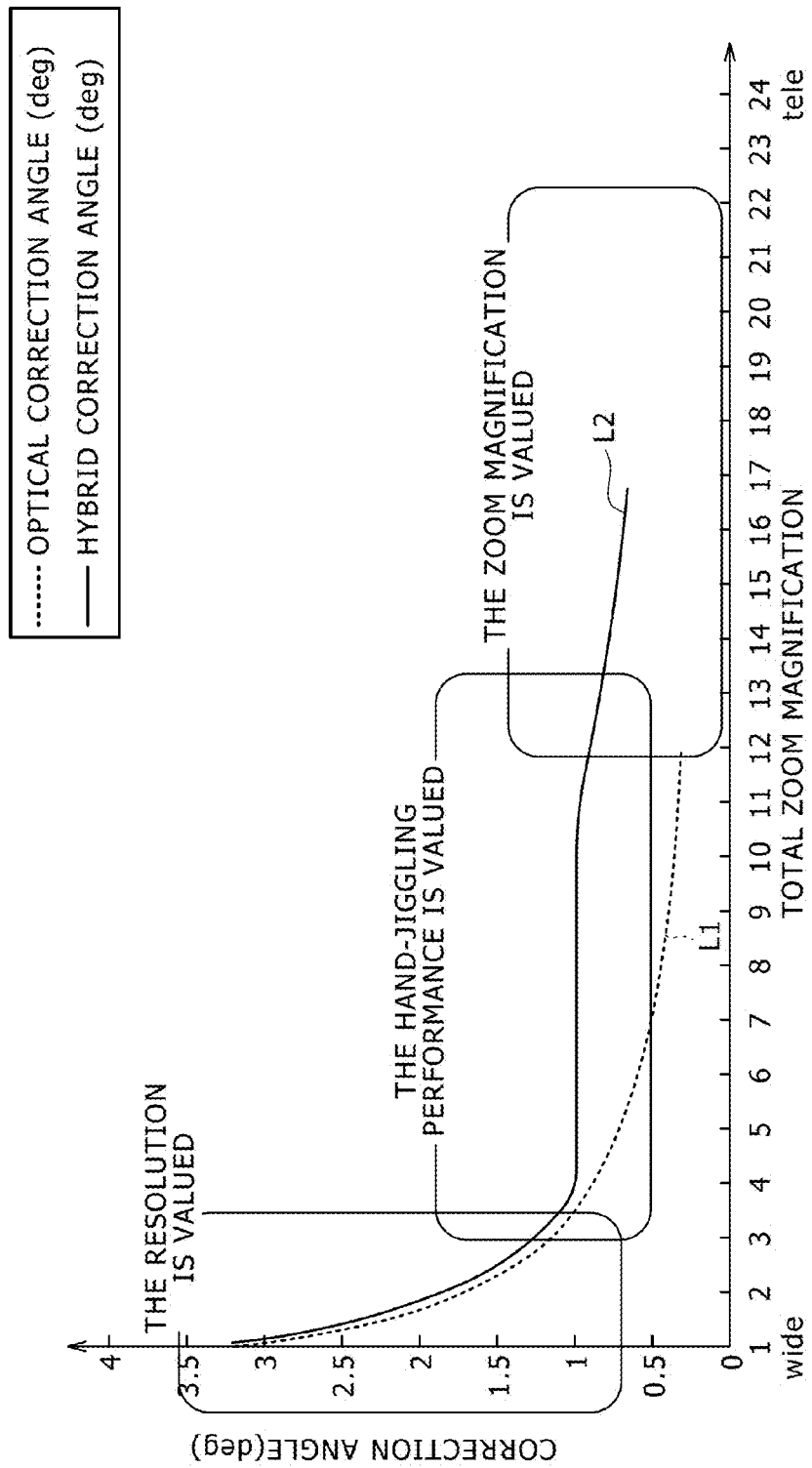

IMAGE AFTER ELECTRONIC
HAND-JIGGLING CORRECTION

IMAGE AFTER ELECTRONIC
HAND-JIGGLING CORRECTION

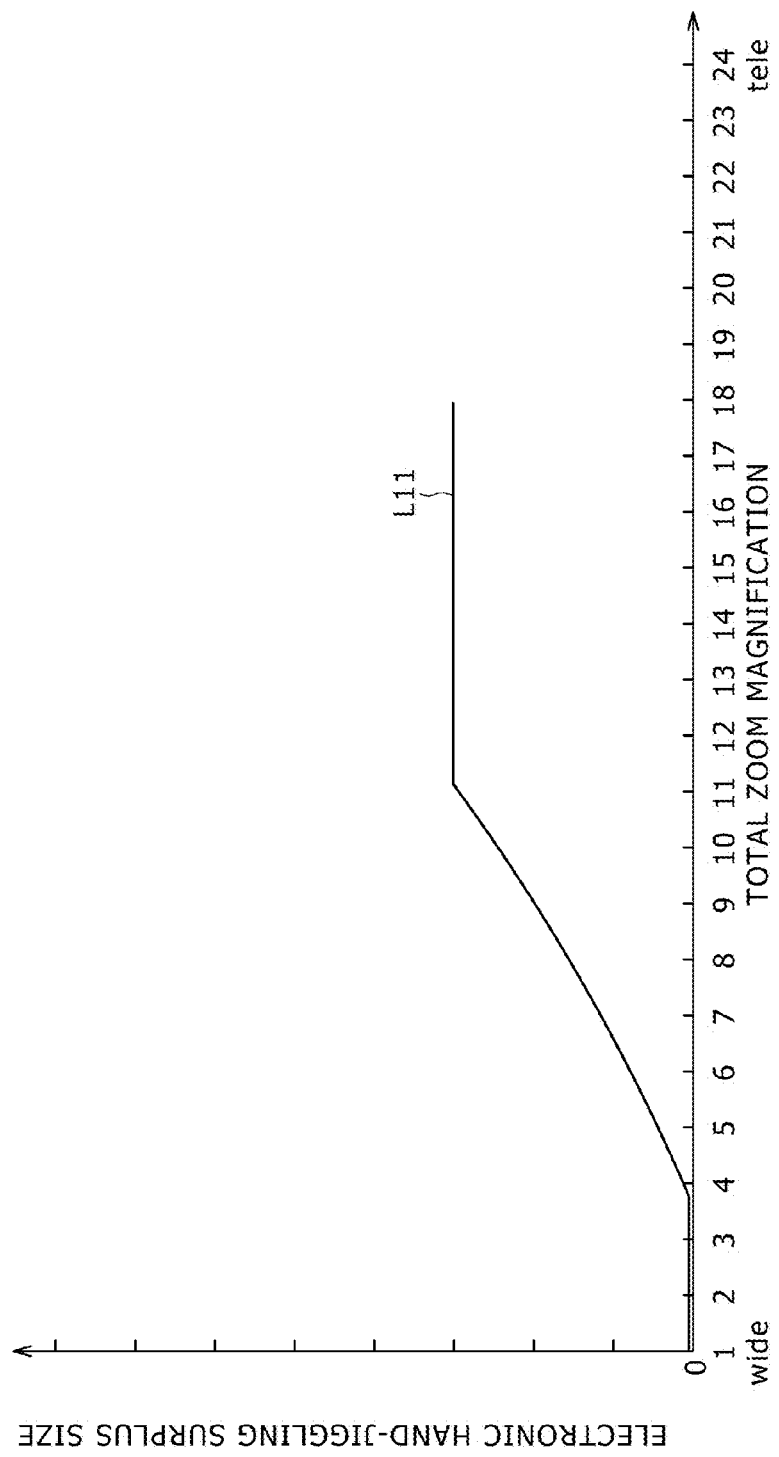

IMAGE AFTER
ELECTRONIC ZOOMING

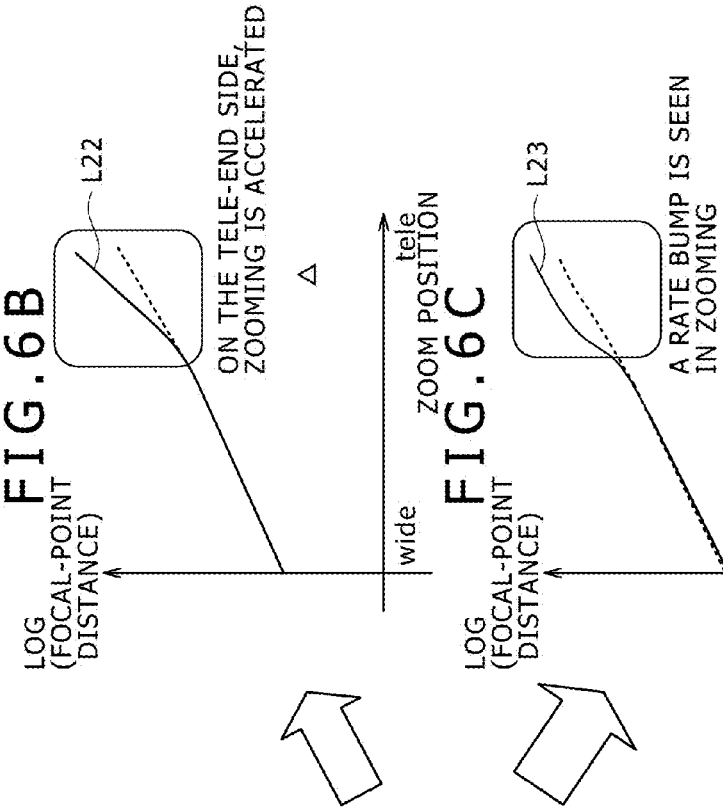
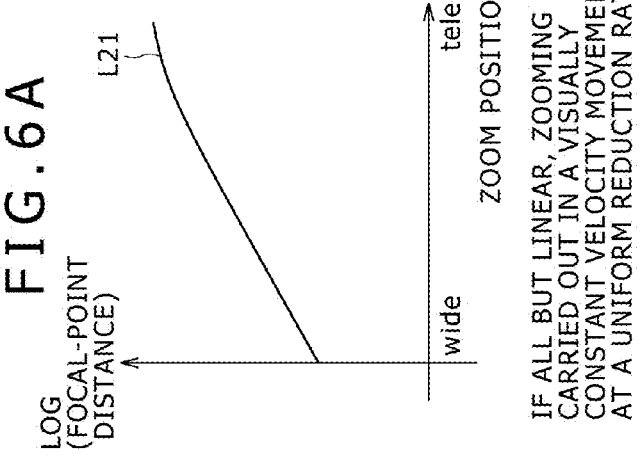

METHODS AND APPARATUS FOR JIGGLING CORRECTION IN IMAGES

BACKGROUND OF THE INVENTION

1. Field of the Invention

In general, the present invention relates to an image capturing apparatus, an image capturing method adopted by the image capturing apparatus and an image capturing program implementing the image capturing method. More particularly, the present invention relates to an image capturing apparatus designed to carry out both optical jiggling correction and electronic jiggling correction, relates to an image capturing method adopted by the image capturing apparatus and relates to an image capturing program implementing the image capturing method.

2. Description of the Related Art

The common digital video camera and the digital still camera may have a jiggling correction function for correcting image blurring which is caused by jiggling of the hands of the user serving as an image capturing person. In the following description, each of the digital video camera and the digital still camera is also referred to simply as a camera. The jiggling correction function can be divided into two large categories, i.e., a function to carry out optical jiggling correction and a function to carry out an electronic jiggling correction. For more information, the reader is advised to refer to Japanese Patent Laid-open No. 2004-88567.

The optical jiggling correction is carried out by adoption of typically a method making use of a gimbal mechanism for moving the entire group of lenses, a method of providing an optical shift lens at an end of the group of lenses, a method making use of a VAP (variable angle prism) or a method of both providing an optical shift lens and a method making use of a VAP. According to any of the methods, the optical axis of light radiated to an imaging device by way of the group of lenses is shifted in accordance with the amount of jiggling which is detected by a gyro sensor. By shifting the optical axis in this way, effects of the jiggling can be eliminated.

An image capturing area is the entire area of an image generated from the imaging device. The electronic jiggling correction is carried out not by taking the image capturing area as it is as the captured image in order to eliminate effects of the jiggling. Instead, the electronic jiggling correction is carried out by taking a cutout area from the image capturing area as the captured image. The cutout area is a portion of the image capturing area. In the electronic jiggling correction, before the cutout area is used as the captured image, the cutout area is moved within the image capturing area in accordance with the amount of jiggling which is detected by the gyro sensor. In the following description, a range in which the cutout area can be moved within the image capturing area is referred to as an electronic jiggling surplus.

SUMMARY OF THE INVENTION

FIG. 1 is a table showing characteristics of the electronic jiggling correction, the optical jiggling correction and hybrid jiggling correction which is a combination of the electronic jiggling correction and the optical jiggling correction. As shown in the table of FIG. 1, in comparison with the electronic jiggling correction, the optical jiggling correction is basically superior. From the size and cost point of view, however, the optical jiggling correction is inferior. In addition, the optical jiggling correction has a demerit that the correction angle inevitably becomes small when the zoom is put on the tele-end side.

In the case of the electronic jiggling correction, on the other hand, when the zoom is put on the tele-end side, the electronic jiggling surplus can be assured even though the image quality deteriorates. Since the electronic jiggling surplus can be assured, nevertheless, the correction angle can also be assured to a certain degree.

Addressing the problems described above, inventors of the present invention have proposed an image capturing apparatus which combines the optical jiggling correction and the electronic jiggling correction into hybrid jiggling correction in order to assure a large correction angle in comparison with the known optical jiggling correction even if the zoom is put on the tele-end side.

According to an embodiment of the present invention there is provided an image capturing control apparatus including:

detection means for detecting the amount of jiggling generated in an image capturing apparatus which includes a lens and an imaging device for converting an optical image supplied to the imaging device by way of the optical lens as an optical image of an subject into an electrical signal serving as an image signal;

optical jiggling correction control means for controlling to carry out optical jiggling correction by shifting the optical image supplied to the imaging device in accordance with the jiggling amount detected by the detection means;

electronic jiggling correction control means for controlling to carry out electronic jiggling correction by moving a cutout area provided on an image represented by the image signal generated by the imaging device as a cutout area with a size determined in advance within a range of an electronic jiggling surplus determined in advance in accordance with the jiggling amount detected by the detection means and by extracting the cutout area of the image; and optical zoom magnification change rate modulation means for controlling optical zoom magnification change rate produced by the optical zoom lens in a manner of being associated with a change of the electronic jiggling surplus designed in advance.

According to another embodiment of the present invention there is provided an image capturing apparatus including:

an optical zoom lens;

an actuator for driving the optical zoom lens;

an imaging device for converting an optical image supplied to the imaging device by way of the optical zoom lens as an optical image of an image capturing subject into an electrical signal serving as an image signal;

detection means for detecting the amount of jiggling generated in the image capturing apparatus;

optical jiggling correction control means for controlling to carry out optical jiggling correction by shifting the optical image supplied to the imaging device in accordance with the jiggling amount detected by the detection means;

electronic jiggling correction control means for controlling to carry out electronic jiggling correction by moving a cutout area provided on an image represented by the image signal generated by the imaging device as a cutout area with a size determined in advance within a range of an electronic jiggling surplus determined in advance in accordance with the jiggling amount detected by the detection means and by extracting the cutout area of the image; and optical zoom magnification change rate modulation means for controlling optical zoom magnification change rate produced by the optical zoom lens in a manner of being associated with a change of the electronic jiggling surplus designed in advance.

According to yet another embodiment of the present invention there is provided an image capturing method for an image capturing apparatus employing an optical zoom lens, an actuator for driving the optical zoom lens and an imaging device for converting an optical image supplied to the imaging device by way of the optical zoom lens as an optical image of an image capturing subject into an electrical signal serving as an image signal, the image capturing method including the steps of:

detecting the amount of jiggling generated in the image capturing apparatus;

carrying out optical jiggling correction by shifting the optical image supplied to the imaging device in accordance with the jiggling amount detected at the detecting step;

carrying out electronic jiggling correction by moving a cutout area provided on an image represented by the image signal generated by the imaging device as a cutout area with a size determined in advance within the range of an electronic jiggling surplus determined in advance in accordance with the jiggling amount detected at the detecting step and by extracting the cutout area of the image; and controlling the actuator in order to modulate the rate of a change of a zoom magnification produced by the optical zoom lens in a manner of being associated with a change of the electronic jiggling surplus designed in advance.

According to yet another embodiment of the present invention there is provided an image capturing program to be executed by a computer of an image capturing apparatus as a program for controlling the image capturing apparatus employing an optical zoom lens, an actuator for driving the optical zoom lens and an imaging device for converting an optical image supplied to the imaging device by way of the optical zoom lens as an optical image of an image capturing subject into an electrical signal serving as an image signal wherein the computer executes the image capturing program in order to carry out processing including the steps of:

detecting the amount of jiggling generated in the image capturing apparatus;

carrying out optical jiggling correction by shifting the optical image supplied to the imaging device in accordance with the jiggling amount detected at the detecting step;

carrying out electronic jiggling correction by moving a cutout area provided on an image represented by the image signal generated by the imaging device as a cutout area with a size determined in advance within the range of an electronic jiggling surplus determined in advance in accordance with the jiggling amount detected at the detecting step and by extracting the cutout area of the image; and controlling the actuator in order to modulate the rate of a change of a zoom magnification produced by the optical zoom lens in a manner of being associated with a change of the electronic jiggling surplus designed in advance.

In accordance with the embodiments of the present invention, first of all, the amount of jiggling generated in the image capturing apparatus is detected. Then, optical jiggling correction is carried out by shifting an optical image supplied to the imaging device in accordance with the detected amount of the jiggling. In addition, electronic jiggling correction is carried out by moving a cutout area provided on an image represented by an image signal generated by the imaging device as a cutout area with a size determined in advance within the range of an electronic jiggling surplus determined in advance in accordance with the detected amount of the jiggling and by extracting the cutout area of the image. Furthermore, the actuator for driving the optical zoom lens is controlled in order to modulate the rate of a change of a zoom magnification produced by the optical zoom lens in a manner of being associated with a change of the electronic jiggling surplus designed in advance.

In accordance with the embodiments of the present invention, by carrying out hybrid jiggling correction, it is possible to assure a large correction angle in comparison with the known optical jiggling correction even if the zoom is put on the tele-end side.

In accordance with the embodiments of the present invention, the zoom magnification can be changed smoothly without causing the user to feel a sense of discomfort.

BRIEF DESCRIPTION OF THE DRAWINGS

FIG. 1 is a table showing characteristics of electronic jiggling correction, optical jiggling correction and hybrid jiggling correction;

FIG. 2 is a diagram showing curves each representing a relation between a total zoom magnification and a correction angle;

FIG. 3A is an explanatory diagram showing a cutout area 12 with a small size and an electronic jiggling surplus with a large size;

FIG. 3B is an explanatory diagram showing a cutout area with a large size and an electronic jiggling surplus 11 with a small size;

FIG. 4 is a diagram showing a curve representing a relation between a total zoom magnification and an electronic jiggling surplus;

FIGS. 6A-6C are a plurality of explanatory diagrams each showing a curve representing a relation between a zoom position and the logarithmic value log E of a focal-point distance E for a total zoom magnification;

FIG. 6A is a diagram showing a curve L21 having an all but constant gradient to represent a relation between the zoom position and the logarithmic value log E of the focal-point distance E for the total zoom magnification;

FIG. 6B is a diagram showing a curve L22 having a variable gradient to represent a relation between the zoom position and the logarithmic value log E of the focal-point distance E for the total zoom magnification;

FIG. 6C is a diagram showing a curve L23 having a bump-like shape to represent a relation between the zoom position and the logarithmic value log E of the focal-point distance E for the total zoom magnification;

DETAILED DESCRIPTION OF THE PREFERRED EMBODIMENTS

Figure 3A:
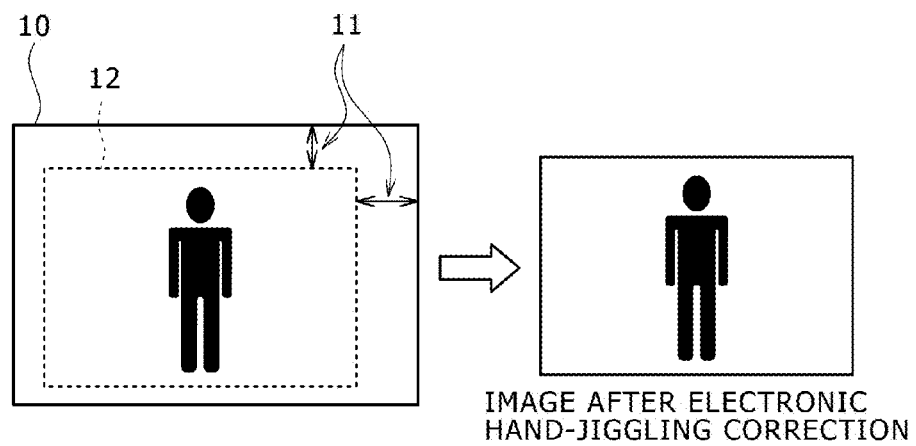
FIGS. 3A and 3B are a plurality of explanatory diagrams to be referred to in description of an electronic jiggling surplus of electronic jiggling correction.

In the following description, preferred embodiments of the present invention are explained in detail by referring to diagrams. In the following description, each of the preferred embodiments is also referred to simply as an embodiment. It is to be noted that the description of the preferred embodiments of the present invention is divided into chapters which are arranged in the following order:
1: Overview of the Invention
2: Embodiments

1. Overview of the Invention

A camera may have an optical zoom function based on a zoom lens and/or an electronic zoom function. In a camera having at least the optical zoom function, the embodiments of the present invention implement hybrid jiggling correction by combining optical jiggling correction with electronic jiggling correction. As shown in FIG. 1 which is a table showing characteristics of the electronic jiggling correction, the optical jiggling correction and the hybrid jiggling correction, the optical jiggling correction and the electronic jiggling correction mutually complement each other for their drawbacks to result in the hybrid jiggling correction which is capable of assuring a correction angle to a certain degree even if the zoom is put on the tele-end side.

In this case, assuring a correction angle to a certain degree even if the zoom is put on the tele-end side implies that the same correction angle on the tele end of the zoom as the correction angle on the wide-angle end of the zoom is not necessarily requested. In the following description, the wide-angle end is also referred to simply as a wide end. That is to say, when a movement of the user holding a camera in order to take an image is taken into consideration, in many cases, if the user takes an image while the user is moving, the zoom is set on the wide-end side. If the user takes an image by setting the zoom on the tele-end side, on the other hand, the user is not moving in many cases. It is needless to say, if the user takes an image while the user is moving, the amount of jiggling increases. If the user is in a static state of taking an image, on the other hand, the amount of jiggling is small. Thus, the camera has only to be designed by setting the correction angle for jiggling on the wide-end side at such a value that, the closer the state of the zoom to the wide-end side, the larger the value at which the correction angle is set. In addition, the camera has only to be designed by setting the correction angle for jiggling on the tele-end side at such a value smaller than the correction angle for jiggling on the wide-end side.

FIG. 2 is a diagram showing curves each representing a relation between a total zoom magnification and a correction angle. The total zoom magnification is the magnification of a combination of an optical zoom and an electronic zoom. A curve L1 shown in the diagram of FIG. 2 represents the relation between the total zoom magnification and a correction angle for only optical jiggling correction. The curve L1 indicates that, the closer the total zoom magnification to the wide-end side, the larger the correction angle of the optical jiggling correction or, the closer the total zoom magnification to the tele-end side, the smaller the correction angle of the optical jiggling correction.

It is to be noted that, as indicated by the curve L1, correction-angle values close to three degrees can be used to keep up with elimination of effects of jiggling which is generated in an image capturing operation which is carried out by the user while the user is walking. Correction-angle values further close to one degree can be used to keep up with elimination of effects of jiggling generated in an image capturing operation carried out by the user in a static state in which the user is casually holding the camera without firmly gripping the camera with a high degree of consciousness. Correction-angle values even further close to 0.3 degrees are assured by optical jiggling correction which already exists when the zoom is put on the tele-end side.

Thus, in the case of a camera provided by the embodiments of the present invention, in order to assure larger correction angles on the tele-end side, it is necessary to implement a correction angle changing in accordance with a characteristic like one represented by a curve L2 shown in the diagram of FIG. 2 by making use of hybrid jiggling correction which is a combination of the optical jiggling correction and electronic jiggling correction.

The shape of the curve L2 is designed so that, as is obvious from the curve L2, on the wide-end side, the resolution is valued and correction angles of about three degrees are assured. Thereafter, till the zoom is moved to the tele-end side, the jiggling correction performance is valued and correction angles of about one degree are assured. Finally, on the tele-end side, the zoom magnification is valued and correction angles not smaller than 0.6 degrees are assured.

It is to be noted that, in the implementation of a correction angle changing in accordance with a characteristic like one represented by a curve L2 shown in the diagram of FIG. 2 by making use of the hybrid jiggling correction which is a combination of the optical jiggling correction and the electronic jiggling correction, the values of the correction angle for the electronic jiggling correction can be determined by subtracting the correction-angle values represented by the curve L1 from the correction-angle values represented by the curve L2 as follows. For the zoom magnifications of one to about four on the horizontal axis of the diagram of FIG. 2, the values of the correction angle for the electronic jiggling correction are set at zero. For the zoom magnifications of about four to about 11 on the horizontal axis of the same diagram, the value of the correction angle for the electronic jiggling correction is increased gradually. For the zoom magnifications greater than about 11 on the horizontal axis of the same diagram, the value of the correction angle for the electronic jiggling correction is fixed.

The setting of the correction quantity of the electronic jiggling correction will be explained below. Prior to the explanation, however, the electronic jiggling correction itself is described again briefly.

Figure 3B:
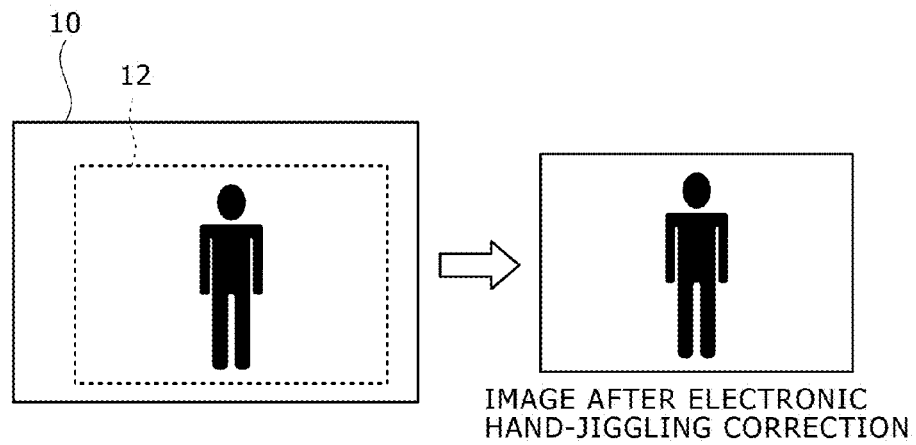

FIGS. 3A and 3B are a plurality of explanatory diagrams to be referred to in description of an electronic jiggling surplus 11 of the electronic jiggling correction. The 2 consecutive images shown in the diagrams of FIGS. 3A and 3B respectively compose a moving image in which jiggling is generated. As shown in the diagrams of FIGS. 3A and 3B, when jiggling is generated, the position of an image capturing subject in the succeeding image is shifted inevitably from the position of the image capturing subject in the preceding image. In order to correct this position-shifting problem, a cutout area 12 is extracted from an image capturing area 10 in order to produce an image which is obtained as a result of an image capturing process and corrected by electronic jiggling correction. The image capturing area 10 is defined as the entire area of an image output from the imaging device. The position of the cutout area 12 may have been shifted over the image capturing area 10 by a distance according to the jiggling amount detected by a gyro sensor.

An electronic jiggling surplus 11 is a range in which the position of the cutout area 12 can be shifted over the image capturing area 10. Thus, the size of the electronic jiggling surplus 11 is a parameter used for determining a correction quantity of the electronic jiggling correction. In the following description, the size of the electronic jiggling surplus 11 is also referred to as an electronic jiggling surplus size.

Thus, the determination of the correction quantity of the electronic jiggling correction in a design process carried out as described above is a process of designing a curve L11 shown in a diagram of FIG. 4 which is a diagram showing a relation between a total zoom magnification and an electronic jiggling surplus. As is obvious from the curve L11 shown in the diagram of FIG. 4, for the total zoom magnifications of 1 to about 4 on the horizontal axis of the diagram of FIG. 4, the electronic jiggling surplus sizes are set at 0. For the total zoom magnifications of about 4 to about 11 on the horizontal axis of the same diagram, the electronic jiggling surplus size is increased gradually. For the total zoom magnifications greater than about 11 on the horizontal axis of the same diagram, the electronic jiggling surplus size is fixed. Thus, by designing the curve L2 into the shape like the one shown in the diagram of FIG. 4 for the electronic jiggling correction, the relation between the total zoom magnification and the correction angle for the hybrid jiggling correction can be designed into the shape of the curve L2 shown in the diagram of FIG. 2.

Figure 5:
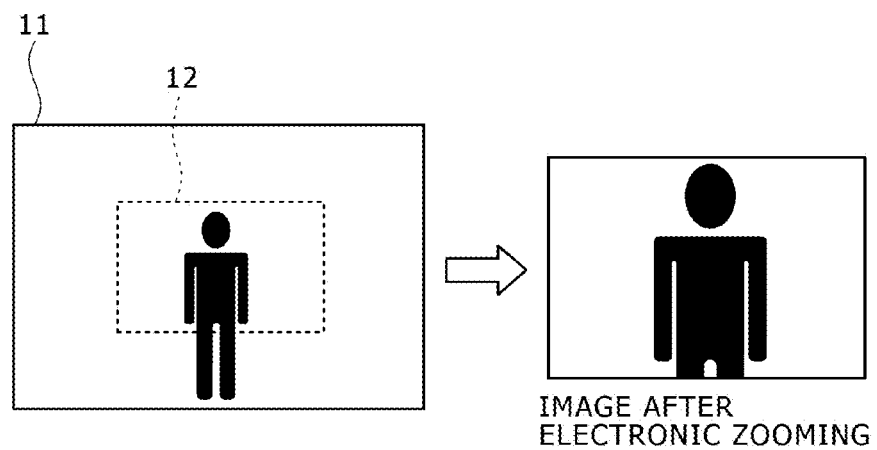
FIG. 5 is an explanatory diagram to be referred to in description of a relation between an electronic zoom and the size of a cutout area.

It is to be noted that, as is also obvious from the diagrams of FIGS. 3A and 3B, the electronic jiggling surplus size changes in a manner opposite to a manner in which the size of the cutout area 12 varies. That is to say, if the size of the cutout area 12 is small, the electronic jiggling surplus size can be made large. If the size of the cutout area 12 is large, on the other hand, the electronic jiggling surplus size must be made small. Meanwhile, as shown in a diagram of FIG. 5 which is an explanatory diagram to be referred to in description of a relation between an electronic zoom and the size of a cutout area 12, the size N (%) of the cutout area 12 is also interlocked with the magnification k of the electronic zoom. That is to say, the following equation holds true:

$$N = 100/k \; (\%)$$

Thus, in order to change the electronic jiggling surplus in accordance with the curve L11 shown in the diagram of FIG. 4, it becomes necessary to also change the magnification k of the electronic zoom in accordance with the changes of the electronic jiggling surplus in a complicated manner. To put it more concretely, it is necessary to change the magnification k of the electronic zoom in accordance with typically a relation represented by a curve L32 shown in a diagram of FIG. 7 to be described later. If the electronic zoom is to be combined or used side by side with the optical zoom on the tele-end side, however, it is necessary to make the change of the total zoom magnification smooth so that the user does not feel a sense of discomfort at the zooming time.

Changes of the total zoom magnification are explained as follows.

Figure 7:
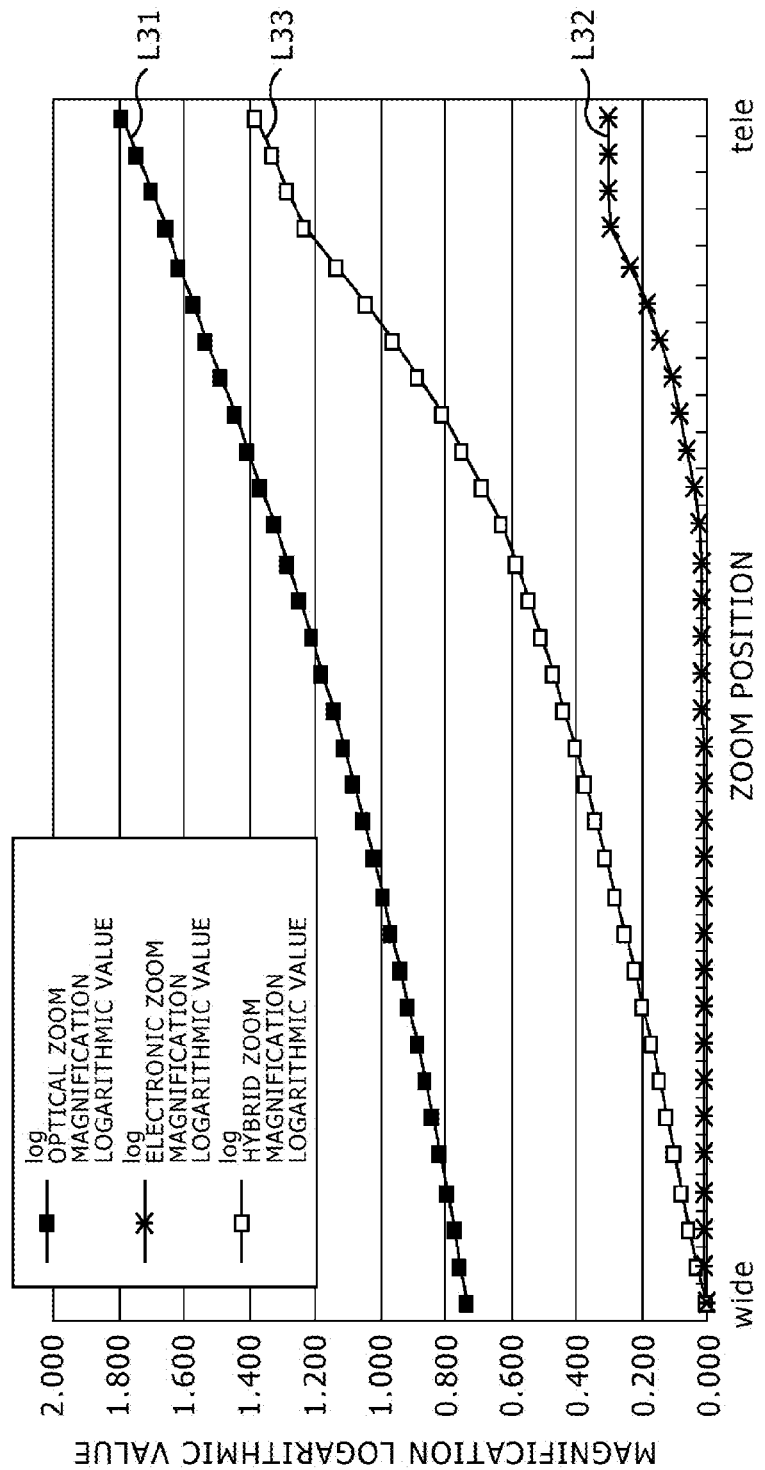
FIG. 7 is a diagram showing curves representing relations between the zoom position and the logarithmic value of the total zoom magnification which is expressed in terms of an electronic zoom magnification, an optical zoom magnification and a hybrid zoom magnification.

FIGS. 6A-6C are a plurality of explanatory diagrams each showing a curve representing a relation between a zoom position and the logarithmic value log E of a focal-point distance E for a total zoom magnification. FIG. 7 is a diagram showing curves representing relations between the zoom position and the logarithmic value of the total zoom magnification which is expressed in terms of an electronic zoom magnification, an optical zoom magnification and a hybrid zoom magnification. In the diagrams of FIGS. 6A-6C, the vertical axis represents the logarithmic value log E of the focal-point distance E. In the diagram of FIG. 7, on the other hand, the vertical axis represents the logarithmic value of the total zoom magnification. In the diagrams of FIGS. 6A-6C and the diagram of FIG. 7, the horizontal axis represents the zoom position. The zoom position has a value which is increased and decreased at a fixed change rate in accordance with an operation carried out by the user.

The curve L21 shown in the diagram of FIG. 6A is a curve representing an ideal relation between the zoom position and the logarithmic value log E of the focal-point distance E for the total zoom magnification. The curve L21 has a constant gradient which is a constant differential value obtained by differentiating the logarithmic value log E of the focal-point distance E with respect to the zoom position. With such an ideal relation between the zoom position and the logarithmic value log E of the focal-point distance E, it is possible to make the user looking at an image obtained as a result of an image capturing process feel that the total zoom magnification is changing smoothly.

The curve L22 shown in the diagram of FIG. 6B is also a curve representing a relation between the zoom position and the logarithmic value log E of the focal-point distance E for the total zoom magnification. The curve L22 has a constant gradient in a zoom-position range which starts at the zoom position on the wide-end side and ends at an intermediate zoom position. At a zoom position on the tele-end side, however, the gradient of the curve L22 increases to imply that the zoom magnification change rate rises for zoom positions on the tele-end side. Even though the relation represented by the curve L22 shown in the diagram of FIG. 6B is not the ideal relation represented by the curve L21 shown in the diagram of FIG. 6A, changes represented by the curve L22 shown in the diagram of FIG. 6B hardly make the user feel a sense of discomfort.

The curve L23 shown in the diagram of FIG. 6C is also a curve representing a relation between the zoom position and the logarithmic value log E of the focal-point distance E for the total zoom magnification. In comparison with the curves L21 and L22, the curve L23 has a shape which includes a bump. The shape including a bump implies that the zoom magnification change rate is once increased in a process of acceleration from a constant-change-rate state and returned again to the original constant-change-rate state. Since the relation represented by the curve L23 shown in the diagram of FIG. 6C does make the user feel a sense of discomfort, changes represented by the curve L23 are not desirable.

If the electronic zoom magnification k is presumed to change in accordance with a curve L32 shown in the diagram of FIG. 7, that is, if the electronic jiggling surplus is changed in accordance with the curve L11 shown in the diagram of FIG. 4, however, an operation to drive the optical zoom at an all but constant change rate in accordance with a curve L31 shown in the diagram of FIG. 7 will unavoidably result in a total zoom magnification which changes in accordance with a curve L33 shown in the diagram of FIG. 7. In the same way as the curve L23 shown in the diagram of FIG. 6C, since the relation represented by the curve L33 shown in the diagram of FIG. 7 does make the user feel a sense of discomfort, changes represented by the curve L33 are not desirable.

It is thus necessary to modulate the rate of the magnification changes on the optical-zoom side by controlling the changes with a high degree of precision in order to set the gradient of a curve representing the relation between the zoom position and the logarithmic value log E of the focal-point distance E for the total zoom magnification at a constant value.

[First Design Technique]

To put it concretely, control is executed in order to make $\delta \log(E)/\delta x$ and $\delta \log(kE)/\delta x$ constant. Here, the expression $\delta$ log(E)/δx is the rate of the change of the total zoom magnification in only the optical zoom prior to enjoinment of the electronic zoom magnification k through multiplication of E by the electronic zoom magnification k to result in kE. On the other hand, the expression δ log (kE)/δx is the rate of the change of the total zoom magnification after enjoinment of the electronic zoom magnification k through multiplication of E by the electronic zoom magnification k to result in kE. Reference symbol E used in the above expression denotes the focal-point distance for the total zoom magnification, reference symbol x denotes the zoom position and reference symbol k denotes the electronic zoom magnification.

The expression δ log(E)/δx expressing the rate of the change of the total zoom magnification in only the optical zoom prior to enjoinment of the electronic zoom magnification k to result in kE is modified in accordance with Eq. (1) given as follows:

$$\delta \log(E)/\delta x = (\delta E/\delta x) \quad (1)$$

On the other hand, the expression δ log(kE)/δx is the rate of the change of the total zoom magnification after enjoinment of the electronic zoom magnification k to result in kE is modified in accordance with Eq. (2) given as follows:

$$\delta \log(kE)/\delta x = (\delta k/\delta x)/k + (\delta E/\delta x)/E \quad (2)$$

Thus, in order to make the expression on the right-hand side of Eq. (1) and the expression on the right-hand side of Eq. (2) constant, it is necessary to carry out modulation by multiplication of the rate V of the change of the electronic zoom magnification k and the maximum value Vmax of the rate V by a deceleration modulation quantity J which is found in accordance with Eq. (3) given below. The expression on the right-hand side of Eq. (1) expresses the modified rate of the change of the total zoom magnification in only the optical zoom prior to enjoinment of the electronic zoom magnification k. On the other hand, the expression on the right-hand side of Eq. (2) expresses the modified rate of the change of the total zoom magnification after enjoinment of the electronic zoom magnification k.

$$J = \{(\delta E/\delta x)/E\}/\{(\delta k/\delta x)/k + (\delta E/\delta x)/E\} \quad (3)$$

Figure 8:
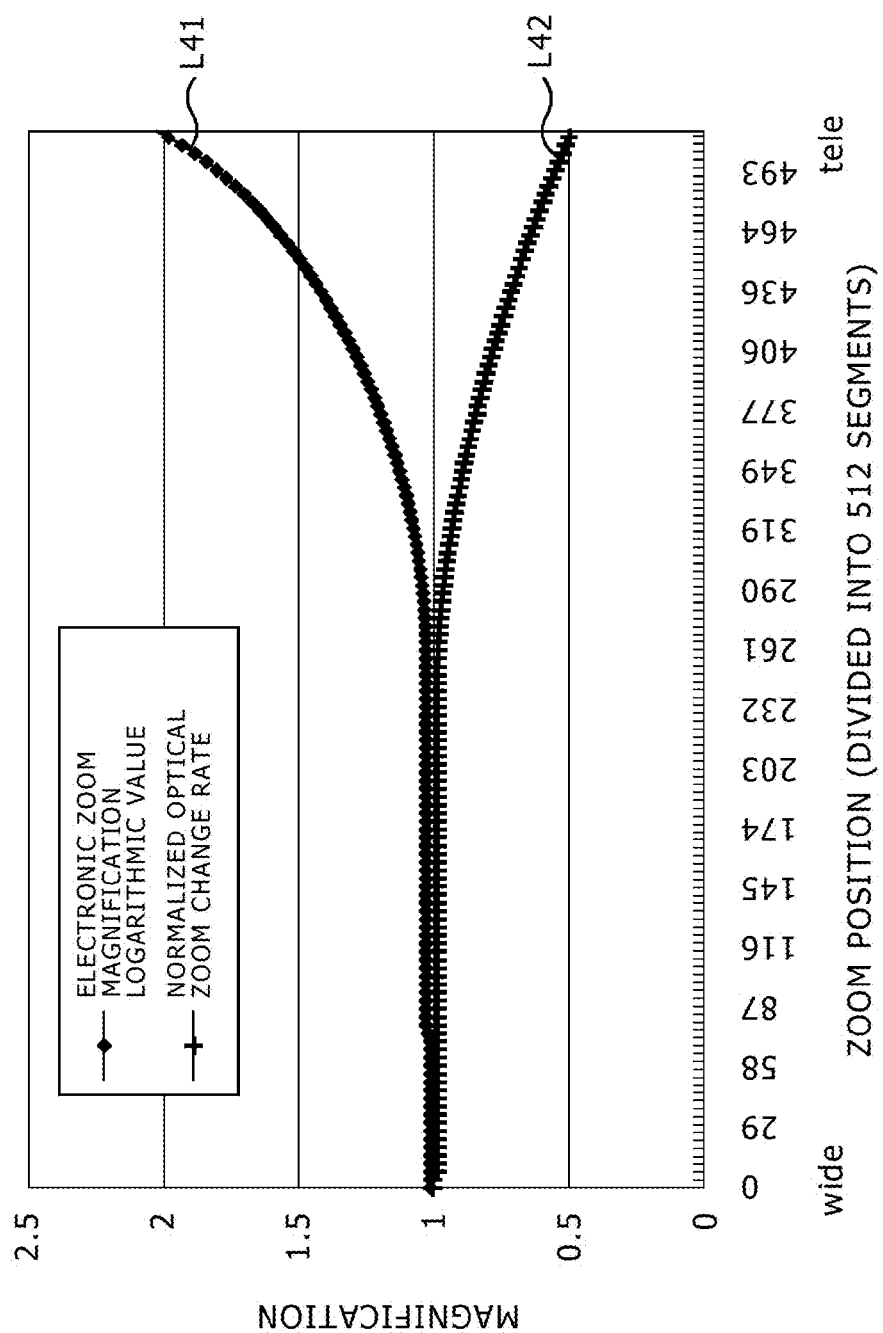
FIG. 8 is a diagram showing a curve L41 representing a relation between an electronic zoom magnification k and a zoom position and showing a curve L42 representing a relation between the post-modulation rate V' of the change of the electronic zoom magnification k and the zoom position.

As a result of the modulation carried out as described above, the electronic zoom magnification k increases as indicated by a curve L41, the post-modulation rate V of the change of the optical zoom magnification decreases as indicated by a curve L42 shown in the diagram of FIG. 8.

The deceleration modulation quantity J can be found by carrying out sequential computation based on Eq. (3). It is to be noted, however, that the deceleration modulation quantity J can also be found by referring to a deceleration modulation quantity table associating deceleration modulation quantities J computed in advance with combinations of the zoom position x, the electronic zoom magnification k and the focal-point distance E.

If the deceleration modulation quantity J is found by carrying out sequential computation, it is possible to perform a difference operation in place of a differential operation like one which is expressed by Eq. (3).

[Second Design Technique]

By the way, in the case of the first design technique, it is presumed that the focal-point distance E of the optical zoom changes at a constant rate. If the focal-point distance E of the optical zoom changes not at a constant rate, however, the deceleration modulation quantity J can be found in accordance with Eq. (4) given as follows:

$$J = \{(\delta E/\delta x(x\_def))/E(x\_def)\}/\{(\delta k/\delta x)/k(\delta E/\delta x)/E\} \quad (4)$$

Reference notation x_def used in an expression on the right-hand side of Eq. (4) denotes a change rate in close proximity to a boundary condition under which the focal-point distance E of the optical zoom changes at a constant rate.

[Third Design Technique]

By the way, if it is desired to arbitrarily design a shape of the change of the electronic zoom magnification k, Eq. (5) given below is used as a base for computing the electronic zoom magnification k. Then, the electronic zoom magnification k found as a result of the computation carried out on the basis of Eq. (5) is inserted into the expression on the right-hand side of Eq. (3) to serve as a substitute for symbol k used in the expression.

$$\{(\delta E/\delta x)/E\}/\{(\delta k/\delta x)/k + (\delta E/\delta x)/E\} = (\delta E\_calc/\delta x)/E\_calc f\{((\delta E/\delta x)/E)/((\delta E\_calc/\delta x)/E\_calc)\} = (\delta E/\delta x)/Edx = \log(k) + C \quad (5)$$

If it is possible to arbitrarily design a shape of the change of the electronic zoom magnification k as described above, problems described below can be solved.

In order to make the velocity of a focus lens follow the maximum change rate time of the zoom for example, there are cases in which processing to decrease the change rate of the zoom is required. In general, this is referred to as a tele-end drop. In a zoom lens having a high magnification, the focus-direction movement distance for the zoom-direction movement distance on the tele-end side is long. Thus, the trend of the tele-end drop is salient. However, the appearance seen at the time the zoom magnification change rate has a high value is different from the appearance seen at the time the zoom magnification change rate has a small value. In addition, since the focal-point distance changes not linearly along a logarithmic axis, the user feels a sense of discomfort undesirably to a certain degree. In order to solve this problem, a focal-point distance curve controlled to a change rate lower than the change rate of the tele-end drop at the maximum change rate is designed. Then, by designing an electronic zoom curve from this focal-point distance curve, the tele-end drop itself can be avoided so that a natural zoom can be realized.

[Fourth Design Technique]

By modulating not only the change rate V of the electronic zoom, but also the maximum value Vmax of the change rate V, it is possible to solve a variety of problems raised by control of the maximum value Vmax. Due to a design problem for example, the shape of a curve representing changes of the focal-point distance may show variations which are difficult to avoid. In such a case, the following equations are adopted:

$$(\delta k/\delta x)/k \propto (\delta E/\delta x)/E$$

$$\log(k) = A \exp(\log E) + B$$

That is to say, the following equation is adopted:

$$\log(k) = E(0)E^A$$

However, the expression on the right-hand side of the above equation includes the Ath power of the focal-point distance E and, at the optical wide end (x=0), k=1 so that E(0) can be used as the focal-point distance for the optical wide end. Then, the shape of a curve representing changes of the electronic zoom magnification k is designed to a state close to this state.

As described above, the shape of a curve representing changes of the electronic zoom magnification k is designed by taking the focal-point distance E as a reference. Thus, modulation of the change rate of the optical zoom can be avoided as much as possible.

By adopting one of the first and fourth design techniques or adopting a combination of the first and fourth design techniques, it is possible to execute smooth control and, at the same time, implement free design of the electronic jiggling surplus. It is to be noted that, depending on the performance of the zoom lens, there are some cases in which the control according to the first design technique cannot be executed. In such cases, only the fourth design technique is adopted.

2. Embodiments

[Typical Configuration of the Digital Video Camera]

Figure 9:
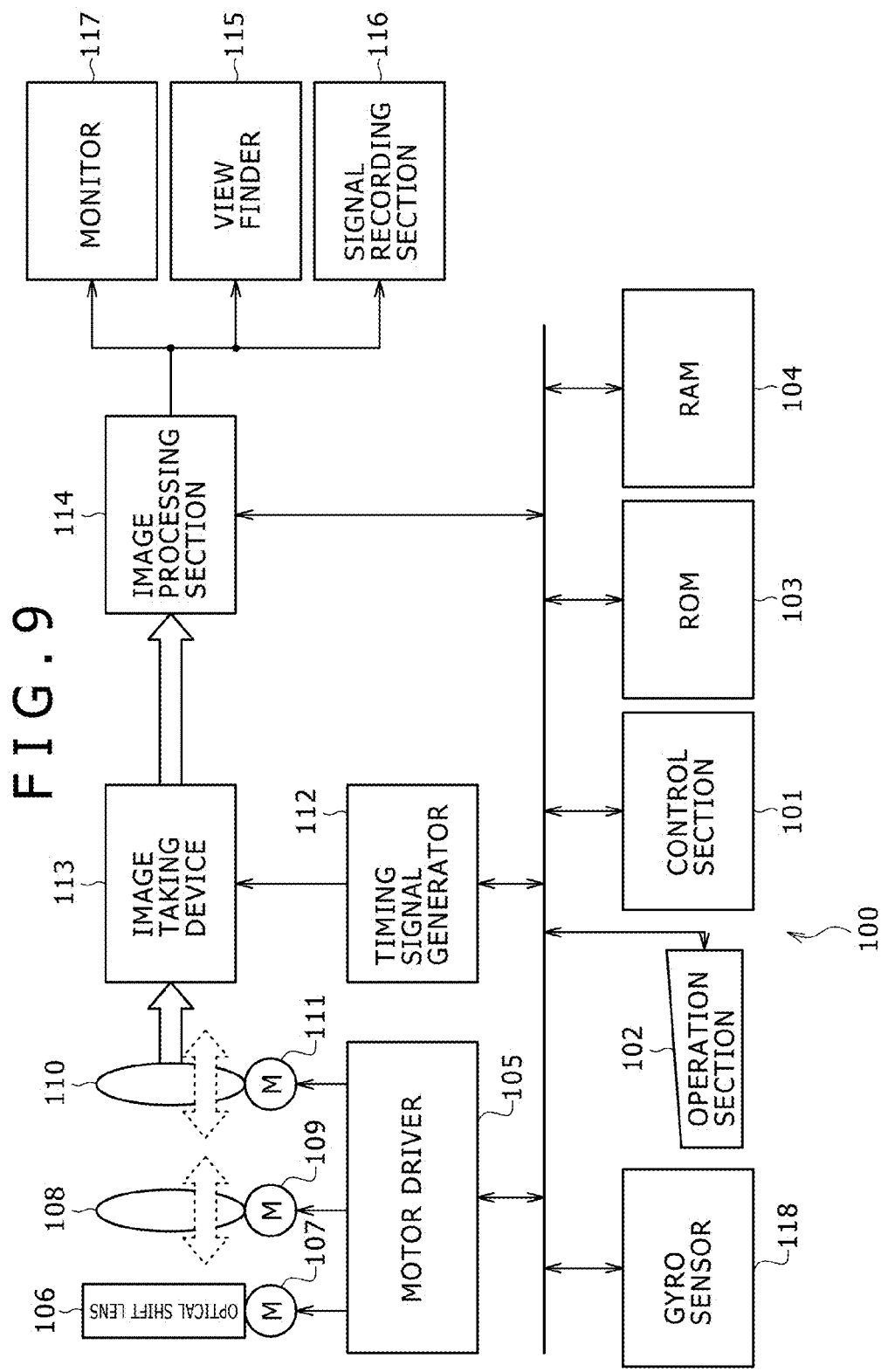
FIG. 9 is a block diagram showing a typical configuration of a digital video camera to which the present invention is applied.

FIG. 9 is a block diagram showing a typical configuration of a digital video camera 100 according to an embodiment of the present invention. The digital video camera 100 has an optical zoom function carried out by making use of a zoom lens and an electronic zoom function. In addition, the digital video camera 100 is also provided with a hybrid jiggling correction function which combines the electronic jiggling correction function with the optical jiggling correction function making use of an optical shift lens. It is to be noted that the following description of the embodiment of the present invention omits an explanation of a sound and a voice which accompany an image.

As shown in the block diagram of FIG. 9, the digital video camera 100 employs a control section 101, an operation section 102, a ROM 103, a RAM 104 and a gyro sensor 118. The control section 101, the operation section 102, the ROM 103, the RAM 104 and the gyro sensor 118 serve as a control system. In addition, the digital video camera 100 includes a motor driver 105, an optical shift lens 106, an optical shift lens actuator 107 for driving the optical shift lens 106, a zoom lens 108, a zoom lens actuator 109 for driving the zoom lens 108, a focus lens 110 and a focus lens actuator 111 for driving the focus lens 110. The motor driver 105, the optical shift lens 106, the optical shift lens actuator 107, the zoom lens 108, the zoom lens actuator 109, the focus lens 110 and the focus lens actuator 111 serve as an image capturing system which also includes a timing generator 112 and an imaging device 113.

On top of that, the digital video camera 100 also has an image processing section 114, a view finder 115, a signal recording section 116 and a monitor 117. The image processing section 114, the view finder 115, the signal recording section 116 and the monitor 117 serve as an image processing system.

The control section 101 employs a CPU for executing a control program stored in advance in the ROM 103 in order to control the aforementioned sections included in the digital video camera 100. The operation section 102 has a variety of buttons and a touch panel laid on the monitor 117. The operation section 102 provides the control section 101 with operation signals which each represent an operation carried out by the user on the operation section 102. The ROM 103 is used for storing the control program cited above and various kinds of information such as a table of deceleration modulation quantities in advance. The RAM 104 is used for temporarily storing various kinds of data. The gyro sensor 118 is a section for detecting jiggling generated in the digital video camera 100 and informing the control section 101 of a detection signal which represents the amount of the jiggling.

In accordance with control carried out by the control section 101, the motor driver 105 drives the optical shift lens actuator 107, the zoom lens actuator 109 and the focus lens actuator 111. The optical shift lens 106 is a lens driven by the optical shift lens actuator 107 in order to carry out the optical jiggling correction. The zoom lens 108 is a lens driven by the zoom lens actuator 109 in order to change the optical zoom magnification. The focus lens 110 is a lens driven by the focus lens actuator 111 in order to change the focal-point distance. The timing generator 112 is a section for controlling timings to acquire pixels in the imaging device 113. Made from a material such as a CMOS (Complementary Metal Oxide Semiconductor) or a CCD (Charge Coupled Device), the imaging device 113 is a section for converting an optical image received by the imaging device 113 from a group of lenses into an image signal serving as electronic data and for supplying the image signal to the image processing section 114.

At an image capturing time, the image processing section 114 generates a moving image for the view finder 115 on the basis of the image signal which is received from the imaging device 113, supplying the moving image to the view finder 115 or the monitor 117. In addition, at a recording time, the image processing section 114 carries out an encoding process on the image signal received from the imaging device 113 in order to generate an encoded video signal as a result of the encoding process and supplies the encoded video signal to the signal recording section 116. On top of that, at a reproduction time, the image processing section 114 carries out a decoding process on the encoded video signal received from the signal recording section 116 in order to generate the original image signal as a result of the decoding process. Then, the image processing section 114 generates a moving image for the monitor 117 on the basis of the original image signal and supplies the moving image to the view finder 115 or the monitor 117.

Moreover, at the image capturing time and the recording time, the image processing section 114 cuts out a partial area determined in advance from the entire area of the image signal received from the imaging device 113 in order to carry out electronic jiggling correction or electronic zooming. The entire area is the image capturing area 10 shown in the diagrams of FIGS. 3A and 3B whereas the partial area is the cutout area 12 shown in the diagrams of FIGS. 3A and 3B.

The view finder 115 is a section for displaying a moving image for the view finder 115 at the image capturing time and a moving image for the monitor 117 at the reproduction time. At the recording time, the signal recording section 116 records an encoded video signal received from the image processing section 114 onto a signal recording medium which is not shown in the block diagram of FIG. 9. In addition, at the reproduction time, the signal recording section 116 reads out the encoded video signal from the signal recording medium and supplies the encoded video signal to the image processing section 114. The monitor 117 is typically a liquid-crystal display unit for displaying a moving image for the view finder 115 at the image capturing time and a moving image for the monitor 117 at the reproduction time. In addition, the monitor 117 also displays a variety of set screens to be shown to the user.

Figure 10:
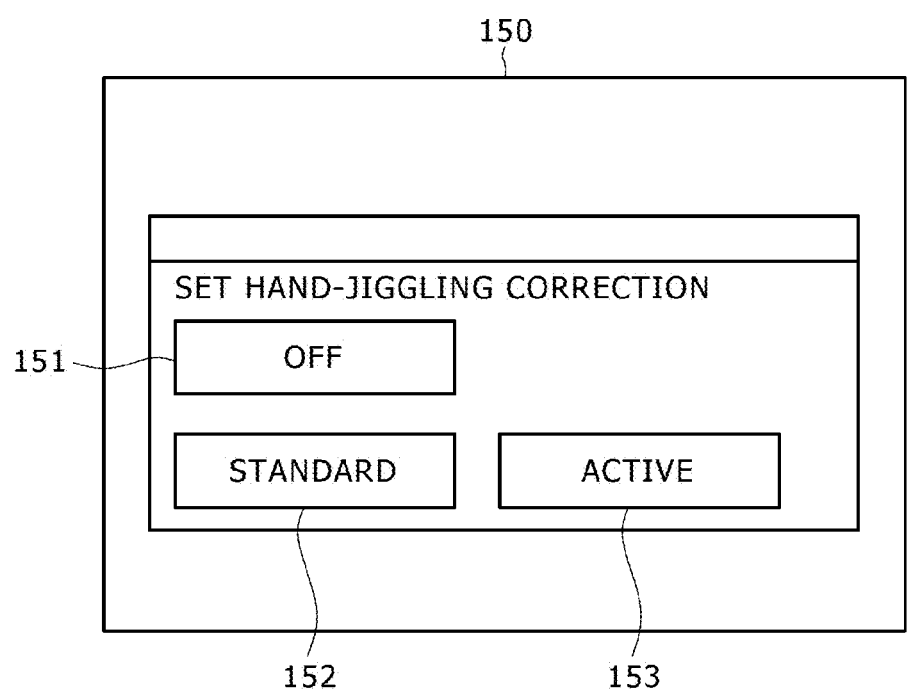
FIG. 10 is a diagram showing a typical screen used for setting a jiggling correction mode.

FIG. 10 is a diagram showing a typical screen 150 displayed on the monitor 117 to serve as a screen used for setting a jiggling correction mode. As shown in the diagram of FIG. 10, the screen 150 shows an off button 151, a standard button 152 and an active button 153. When the off button 151 is selected, the hand-jiggling correction function is disabled. When the standard button 152 is selected, a standard jiggling correction mode is set. In the standard jiggling correction mode, the optical jiggling correction function is enabled but the electronic jiggling correction function is disabled. When the active button 153 is selected, a hybrid jiggling correction mode is set. In the hybrid jiggling correction mode, both the optical jiggling correction function and the electronic jiggling correction function are enabled.

In comparison with the standard jiggling correction mode, the hybrid jiggling correction mode allows a large jiggling correction angle on the tele-end side to be assured. Thus, the user can carry out an image capturing operation while the user is moving briskly. Since a cutout area 12 is cut out from the image capturing area 10 in the electronic jiggling correction, however, there may be a case in which the size of the cutout area 12 is smaller than the field angle size of a moving image to be stored in the signal recording medium. In such a case, processing is carried out to enlarge the image of the cutout area 12. Due to typically the processing carried out to enlarge the image of the cutout area 12, however, the quality of the image may deteriorate in some cases. If the size of the cutout area 12 is smaller than the field angle size of a moving image to be stored in the signal recording medium, as an alternative, it is necessary to limit the field angle size.

[Operation Explanation]

The following description explains optical zoom magnification change rate control processing. The optical zoom magnification change rate control processing is processing to control the rate of the change of the optical zoom magnification which is obtained as a result of driving the zoom lens 108 when the digital video camera 100 is set in the hybrid jiggling correction mode.

Figure 11:
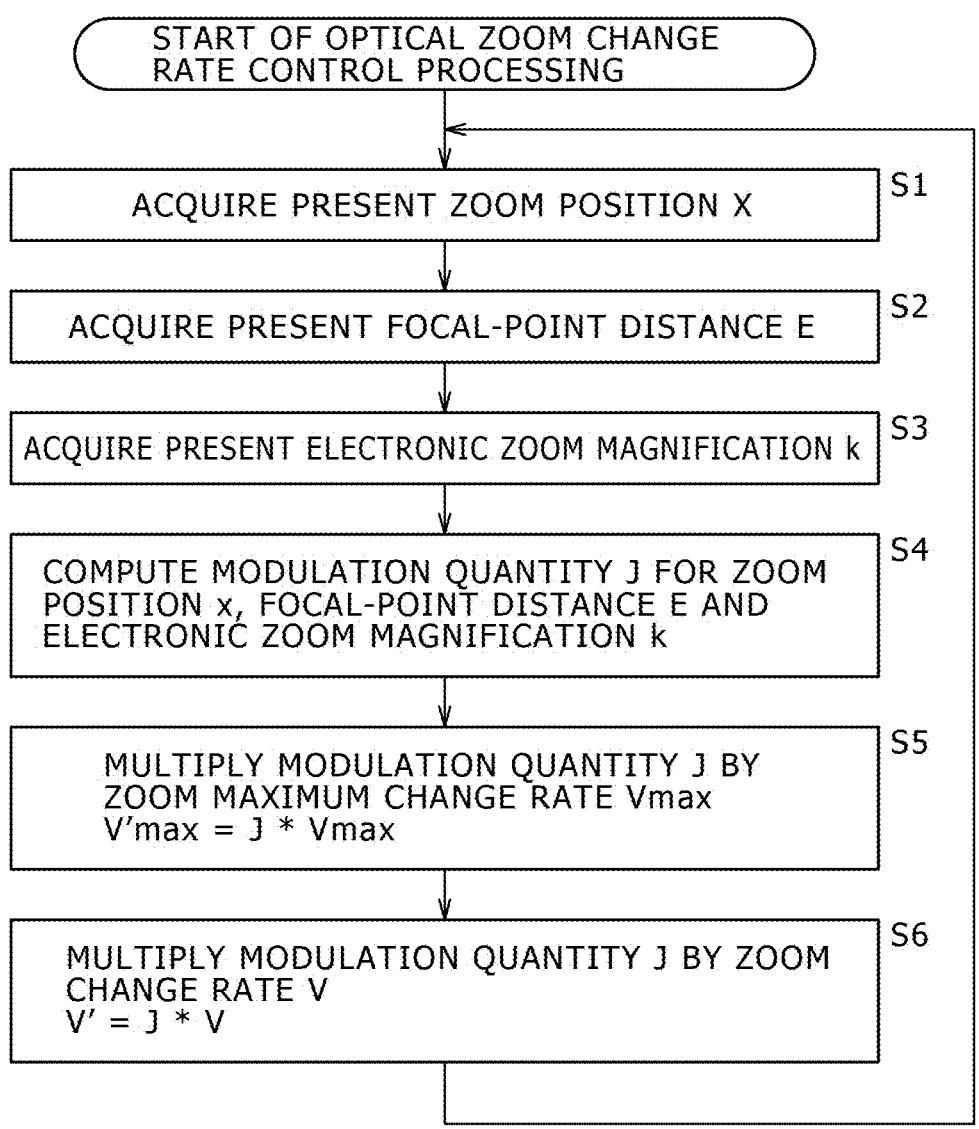
FIG. 11 is a flowchart to be referred to in explanation of optical zoom magnification change rate control processing.

FIG. 11 is a flowchart to be referred to in explanation of optical zoom magnification change rate control processing.

As shown in FIG. 11, the flowchart begins with a step S1 at which the control section 101 acquires the present zoom position x of the zoom lens 108 on the basis of a zoom operation carried out by the user operating the operation section 102. Then, at the next step S2, the control section 101 acquires the present focal-point distance E of the zoom lens 108 from the motor driver 105. Subsequently, at the next step S3, the control section 101 acquires the present electronic zoom magnification k.

Then, at the next step S4, the control section 101 computes the deceleration modulation quantity J in accordance with Eq. (3) by making use of the zoom position x, the focal-point distance E and the electronic zoom magnification k. Specifically, in accordance with Eq. (3), the control section 101 computes the deceleration modulation quantity J by making use of the zoom position x, the focal-point distance E, and the electronic zoom magnification k obtained, respectively, at the steps S1 to S3 in the immediately preceding execution of the optical zoom magnification change rate control processing represented by the flowchart and the zoom position x, the focal-point distance E, and the electronic zoom magnification k obtained, respectively, at the steps S1 to S3 in the current execution of the optical zoom magnification change rate control processing represented by the flowchart.

As an alternative, instead of computing the deceleration modulation quantity J in accordance with Eq. (3), the control section 101 may compute the deceleration modulation quantity J by carrying out an equivalent difference operation.

As another alternative, the control section 101 may find the deceleration modulation quantity J by referring to a deceleration modulation quantity table prepared in advance to serve as a table associating deceleration modulation quantities J computed in advance with combinations of the zoom position x, the electronic zoom magnification k and the focal-point distance E.

Then, at the next step S5, the control section 101 multiplies the deceleration modulation quantity J by a maximum optical zoom magnification change rate Vmax determined in advance as the maximum value of the rates of the change of the optical zoom magnification (that is, the maximum value of optical zoom magnification change rates V cited below) in order to modulate the maximum optical zoom magnification change rate Vmax as follows:

$$V'\text{max} = JV\text{max}$$

Subsequently, at the next step S6, the control section 101 multiplies the deceleration modulation quantity J by the optical zoom magnification change rate V determined in advance as the rate of the change of the optical zoom magnification in order to modulate the zoom magnification change rate V as follows:

$$V' = JV$$

Then, the control section 101 supplies the maximum optical zoom magnification change rate V'max and the zoom magnification change rate V' which have been obtained as results of the modulation processes carried out at the steps S5 and S6 respectively to the motor driver 105. On the basis of the maximum optical zoom magnification change rate V'max and the zoom magnification change rate V' which have been received from the control section 101, the motor driver 105 drives the zoom lens actuator 109 to move the zoom lens 108 in order to control the rate of the change of the zoom magnification. Then, the flow of the optical zoom magnification change rate control processing represented by the flowchart goes back to the step S1. When the execution of the process at the step S6 is completed before the flow of the optical zoom magnification change rate control processing represented by the flowchart goes back to the step S1, the current execution of the optical zoom magnification change rate control processing represented by the flowchart is ended.

In the execution of the optical zoom magnification change rate control processing represented by the flowchart described above, the first design technique explained before is applied to the digital video camera 100. It is to be noted, however, that the any one of the second to fourth design techniques explained before can also be applied to the digital video camera 100 in the execution of the optical zoom magnification change rate control processing represented by the flowchart described above.

[Typical Modifications]

By the way, there is a large driving noise which is generated in the operation to drive the zoom lens 108. When the rate of the change of the optical zoom magnification becomes high, a resonance sound is generated by the zoom lens 108 and the lens tube of the zoom lens 108 and heard by the user in some cases. In order to get rid of such a resonance sound, the change rate is fixed except during a process to vary the change rate in a step-by-step manner, and the fixed change rate is subjected to modulation. In addition, throughout the entire area of the zoom, the fixed change rate can be limited to a change rate that does not cause a resonance sound to be generated.

If a very low change rate is selected as the fixed change rate, there is concern that not only a change point of a resolution in the zoom direction of the change rate modulation is striking, but a change point of the change rate of the zoom is also striking as well. In general, however, such change points are not striking. If such a problem were raised for example, the problem could be solved by terminating the modulation only for a very low change rate.

CONCLUSION

In accordance with the digital video camera provided by the embodiments of the present invention, while hybrid jiggling correction is being implemented, it is possible to prevent the user from feeling a sense of discomfort due to a change of the size of an image capturing subject image within a whole image.

For typically the digital video camera provided by the embodiments of the present invention, it is possible to arbitrarily design the shape of a curve such as the curve L11 which represents changes of an electronic jiggling surplus as shown in the diagram of FIG. 4. Thus, for a hybrid zoom combining the electronic zoom with the optical zoom, it is also possible to arbitrarily design the combination. In addition, it is also possible to eliminate unnatural image transitions caused by a tele-end drop and control the zoom magnification change rate to a high change rate. On top of that, it is also possible to design the change rate of the enlargement and/or contraction of an image as a change rate according to a flexible transition curve.

The present application contains subject matter related to that disclosed in Japanese Priority Patent Application JP 2009-273516 filed in the Japan Patent Office on Dec. 1, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing control apparatus comprising:
   detection means configured to detect an amount of jiggling generated in an image capturing apparatus which includes an optical zoom lens and an imaging device for converting an optical image of a subject supplied to said imaging device by way of said optical zoom lens into an electrical signal representing an image;
   optical jiggling correction control means configured to control carrying out optical jiggling correction at least in part by shifting said optical image in accordance with said jiggling amount; and
   electronic jiggling correction control means configured to control carrying out electronic jiggling correction at least in part by moving a cutout area provided on the image,
   wherein the image capturing control apparatus is configured to perform jiggling correction in a hybrid mode by using both the optical jiggling correction control means and the electronic jiggling control means,
   wherein the image capturing control apparatus further comprises optical zoom magnification change rate modulation means configured to control a magnification change rate produced by said optical zoom lens based at least in part on a change rate V and a maximum change rate Vmax,
   wherein the change rate V is determined based at least in part on a deceleration modulation quantity J obtained from a zoom position x according to a zoom operation carried out by a user, an electronic zoom magnification k interlocked with a change of electronic jiggling surplus designed in advance, and a focal-point distance E of said optical zoom lens, and
   wherein the maximum change rate Vmax is determined based at least in part on the deceleration modulation quantity J.

2. The image capturing control apparatus according to claim 1, wherein said optical zoom magnification change rate modulation means sequentially computes said deceleration modulation quantity J by carrying out a differential or difference operation making use of said zoom position x according to the zoom operation carried out by the user, said electronic zoom magnification k interlocked with the change of said electronic jiggling surplus designed in advance and said focal-point distance E of said optical zoom lens.

3. The image capturing control apparatus according to claim 1, wherein said optical zoom magnification change rate modulation means acquires said deceleration modulation quantity J by referring to a deceleration modulation quantity table associating deceleration modulation quantities J computed in advance with combinations of said zoom position x according to the zoom operation carried out by the user, said electronic zoom magnification k interlocked with the change of said electronic jiggling surplus designed in advance and said focal-point distance E of said optical zoom lens.

4. The image capturing control apparatus according to claim 1, wherein said electronic jiggling surplus is designed in advance to change its size by making sequential transitions through a zone of a zero size, a zone of a gradually increasing size and a zone of sustaining a maximum size when said zoom position is moved from a wide-end side to a tele-end side.

5. The image capturing control apparatus of claim 1, wherein the image capturing control apparatus is further configured to control a magnification change rate produced by the optical zoom lens based at least in part on a present electronic zoom magnification of the imaging device.

6. An image capturing apparatus comprising:
   an optical zoom lens;
   an actuator for driving said optical zoom lens;
   an image taking device for converting an optical image of a subject supplied to said image taking device by way of said optical zoom lens into an electrical signal representing an image;
   detection means configured to detect an amount of hand jiggling generated in said image capturing apparatus;
   optical hand-jiggling correction means configured to carry out optical hand-jiggling correction at least in part by shifting said optical image in accordance with said hand-jiggling amount; and
   electronic hand-jiggling correction means configured to carry out electronic hand-jiggling correction at least in part by moving a cutout area provided on the image,
   wherein the image capturing apparatus is configured to perform jiggling correction in a hybrid mode by using both the optical hand-jiggling correction means and the electronic hand-jiggling means,
   wherein the image capturing apparatus further comprises optical zoom magnification change rate modulation means configured to control a magnification change rate produced by said optical zoom lens based at least in part on a change rate V and a maximum change rate Vmax,
   wherein the change rate V is determined based at least in part on a deceleration modulation quantity J obtained from a zoom position x according to a zoom operation carried out by a user, an electronic zoom magnification k interlocked with a change of electronic jiggling surplus designed in advance, and a focal-point distance E of said optical zoom lens, and
   wherein the maximum change rate Vmax is determined based at least in part on the deceleration modulation quantity J.

7. The image capturing apparatus of claim 6, wherein the image capturing apparatus is further configured to control a magnification change rate produced by the optical zoom lens based at least in part on a present electronic zoom magnification of the imaging device.

8. An image capturing method for an image capturing apparatus employing an optical zoom lens, an actuator for driving said optical zoom lens, and an imaging device for converting an optical image of a subject supplied to said imaging device by way of said optical zoom lens into an electrical signal representing an image, said image capturing method comprising:

detecting an amount of jiggling generated in said image capturing apparatus;

carrying out optical jiggling correction at least in part by shifting said optical image supplied to said imaging device in accordance with said jiggling amount;

carrying out electronic jiggling correction at least in part by moving a cutout area provided on the image wherein the method comprises carrying out, in a hybrid mode, both optical jiggling correction and electronic jiggling correction, wherein the method comprises controlling a magnification change rate produced by said optical zoom lens based at least in part on a change rate V and a maximum change rate Vmax, wherein the change rate V is determined based at least in part on a deceleration modulation quantity J obtained from a zoom position x according to a zoom operation carried out by a user, an electronic zoom magnification k interlocked with a change of electronic jiggling surplus designed in advance, and a focal-point distance E of said optical zoom lens, and wherein the maximum change rate Vmax is determined based at least in part on the deceleration modulation quantity J.

9. The image capturing method of claim 8, further comprising controlling a magnification change rate produced by the optical zoom lens based at least in part on a present electronic zoom magnification of the imaging device.

10. A computer memory storing an image capturing program to be executed by a computer of an image capturing apparatus as a program for controlling said image capturing apparatus employing an optical zoom lens, an actuator for driving said optical zoom lens and an imaging device for converting an optical image of a subject supplied to said imaging device by way of said optical zoom lens into an electrical signal representing an image, wherein when said computer executes said image capturing program, said computer is configured to perform an image capturing method comprising:

detecting an amount of jiggling generated in said image capturing apparatus;

carrying out optical jiggling correction at least in part by shifting said optical image supplied to said imaging device in accordance with said jiggling amount;

carrying out electronic jiggling correction at least in part by moving a cutout area provided on the image wherein the method comprises carrying out, in a hybrid mode, both optical jiggling correction and electronic jiggling correction, wherein the method comprises controlling a magnification change rate produced by said optical zoom lens based at least in part on a change rate V and a maximum change rate Vmax, wherein the change rate V is determined based at least in part on a deceleration modulation quantity J obtained from a zoom position x according to a zoom operation carried out by a user, an electronic zoom magnification k interlocked with a change of electronic jiggling surplus designed in advance, and a focal-point distance E of said optical zoom lens, and wherein the maximum change rate Vmax is determined based at least in part on the deceleration modulation quantity J.

11. The computer memory of claim 10, wherein the image capturing method further comprises controlling a magnification change rate produced by the optical zoom lens based at least in part on a present electronic zoom magnification of the imaging device.

\* \* \* \* \*